United States Patent
Takeshima

(10) Patent No.: US 8,666,132 B2
(45) Date of Patent: Mar. 4, 2014

(54) DATA COMPRESSION METHOD AND DATA COMPRESSION APPARATUS

(75) Inventor: Hidenori Takeshima, Ebina (JP)

(73) Assignee: Kabushiki Kaisha Toshiba, Tokyo (JP)

(*) Notice: Subject to any disclaimer, the term of this patent is extended or adjusted under 35 U.S.C. 154(b) by 95 days.

(21) Appl. No.: 13/372,657

(22) Filed: Feb. 14, 2012

(65) Prior Publication Data

US 2012/0220877 A1 Aug. 30, 2012

(30) Foreign Application Priority Data

Feb. 28, 2011 (JP) .................. 2011-042465

(51) Int. Cl.
- *G06K 9/00* (2006.01)
- *A61B 5/05* (2006.01)
- *A61B 8/00* (2006.01)
- *G10L 19/00* (2013.01)

(52) U.S. Cl.
USPC ............ 382/128; 600/407; 600/437; 704/500

(58) Field of Classification Search
USPC ......... 382/128–134, 232, 233, 234, 243, 244, 382/235; 600/407, 437, 441, 453, 455, 457, 600/410; 367/86, 87; 704/500, 503; 128/920, 922
See application file for complete search history.

(56) References Cited

U.S. PATENT DOCUMENTS

| 6,126,605 A * | 10/2000 | Washburn et al. ............ 600/454 |
| 6,643,402 B1 * | 11/2003 | Okada ............................ 382/232 |
| 2011/0242938 A1 * | 10/2011 | Garcia-Osuna et al. ........ 367/86 |

FOREIGN PATENT DOCUMENTS

| JP | 2009-516546 | 4/2009 |
| WO | WO 2007/111680 A2 | 10/2007 |

OTHER PUBLICATIONS

U.S. Appl. No. 13/232,240, filed Sep. 14, 2011, Hidenori Takeshima.

* cited by examiner

*Primary Examiner* — Abolfazl Tabatabai
(74) *Attorney, Agent, or Firm* — Oblon, Spivak, McClelland, Maier & Neustadt, L.L.P.

(57) ABSTRACT

One embodiment provides a data compression apparatus for compressing Doppler data including a plurality of types of measurement data obtained by ultrasound measurement, the apparatus including: a first compression unit configured to compress first measurement data according to a first compression parameter to thereby generate first compressed data; a second compression unit configured to compress second measurement data according to a second compression parameter different from the first compression parameter to thereby generate second compressed data; and a combining unit configured to combine the first compressed data and the second compressed data.

16 Claims, 16 Drawing Sheets

FIG. 7

| 11 | 12 | 12 | 16 | 24 | 40 | 51 | 61 |
|----|----|----|----|----|----|----|----|
| 12 | 12 | 14 | 19 | 26 | 58 | 60 | 61 |
| 14 | 14 | 16 | 24 | 40 | 58 | 69 | 69 |
| 14 | 17 | 22 | 29 | 51 | 87 | 87 | 87 |
| 18 | 22 | 37 | 56 | 68 | 99 | 99 | 99 |
| 24 | 35 | 55 | 64 | 81 | 99 | 99 | 99 |
| 49 | 64 | 78 | 87 | 99 | 99 | 99 | 99 |
| 72 | 92 | 95 | 98 | 99 | 99 | 99 | 99 |

*FIG. 10A*

| 3LL | 3HL | 2HL | 1HL |
|---|---|---|---|
| 3LH | 3HH | | |
| 2LH | | 2HH | |
| 1LH | | | 1HH |

*FIG. 10B*

| 11 | 12 | 15 | 42 |
|---|---|---|---|
| 12 | 12 | | |
| 17 | | 23 | |
| 45 | | | 87 |

*FIG. 13*

|  | C[-2] | C[-1] | C[0] | C[1] | C[2] |
|---|---|---|---|---|---|
| LPF | -1/8 | 2/8 | 6/8 | 2/8 | -1/8 |
| HPF |  | -1/2 | 1 | -1/2 |  |
| INVERSE LPF |  | 1/2 | 1 | 1/2 |  |
| INVERSE HPF | -1/8 | -2/8 | 6/8 | -2/8 | -1/8 |

DATA COMPRESSION METHOD AND DATA COMPRESSION APPARATUS

CROSS-REFERENCE TO RELATED APPLICATION(S)

This application claims priority from Japanese Patent Application No. 2011-042465 filed on Feb. 28, 2011, the entire contents of which are incorporated herein by reference.

FIELD

Embodiments described herein relate generally to a data compression method and to a data compression apparatus.

BACKGROUND

Data compression methods exist in such fields as medicine for compressing data measured by an ultrasonic diagnostic apparatus in order to produce images. An ultrasonic diagnostic apparatus emits ultrasonic waves towards a subject (for example a body of a human or animal), and measure the internal state (such as the flow of internal fluids (such as blood)) of the subject by detecting reflected waves.

Imaging methods include, for example, a B-mode for imaging brightness, an M-mode for imaging movement, color Doppler imaging (CDI) for imaging velocity of blood flow (speed and direction), dispersion, and power data (intensity of reflected ultrasonic wave), and power Doppler imaging (PDI) for imaging the reflection intensity of a Doppler shifted signal.

CDI renders an image by superimposing Doppler data including blood flow data (speed and distribution) and power data on B-mode data.

In related data compression methods logarithmic compression is only applied to the B-mode data, and the color Doppler data is not compressed. However, there is a need for greater data compression due to the increase in the volume of data accompanying such developments as increasingly high precision of ultrasonic diagnostic apparatuses.

BRIEF DESCRIPTION OF DRAWINGS

A general architecture that implements the various features of the present invention will now be described with reference to the drawings. The drawings and the associated descriptions are provided to illustrate embodiments and not to limit the scope of the present invention.

FIG. 7 illustrates a quantization table.

FIG. 10A and FIG. 10B illustrate a quantization table.

FIG. 13 illustrates wavelet transform coefficients for LPF and HPF.

DETAILED DESCRIPTION

Figure 1:
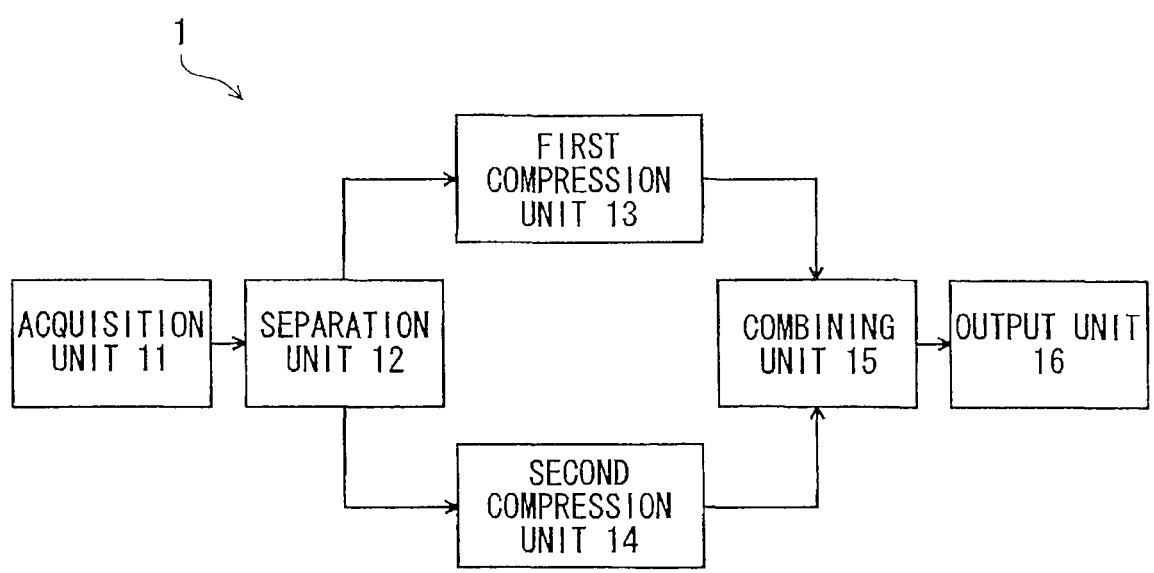
FIG. 1 illustrates a data compression apparatus 1 according to a first embodiment.

One embodiment provides a data compression apparatus for compressing Doppler data including a plurality of types of measurement data obtained by ultrasound measurement, the apparatus including: a first compression unit configured to compress first measurement data according to a first compression parameter to thereby generate first compressed data; a second compression unit configured to compress second measurement data according to a second compression parameter different from the first compression parameter to thereby generate second compressed data; and a combining unit configured to combine the first compressed data and the second compressed data.

First Embodiment

A data compression apparatus 1 according to a first embodiment can be applied in the medical field, such as in an ultrasonic diagnostic apparatus (not shown). The data compression apparatus 1 compresses color Doppler data generated by an ultrasonic diagnostic apparatus in color Doppler imaging (CDI).

Color Doppler data includes blood flow data and power data. Blood flow data includes the velocity (average flow speed and direction) of a fluid (blood flow) and dispersion (degree of turbulence). Namely, blood flow data expresses the spatial movement of blood. When an ultrasonic diagnostic apparatus performs a diagnosis of a subject using a probe, the direction of the blood flow is either a direction approaching the probe, or a direction moving away from the probe. Power data includes intensity of reflected ultrasonic waves.

While the blood is exemplified as the fluid in the embodiment, the embodiment may be adapted for another fluid (a body fluid in a person or animal, such as lymphatic fluid).

If such color Doppler data is simply compressed, for example, image quality may be distorted depending on the type of data, and it may affect the results of medical diagnosis by a doctor.

The data compression apparatus 1 accordingly performs different kinds of compressions according to the type of data. Compression is specifically performed on color Doppler data such that, when the compressed data is decompressed, the quality of blood flow data is higher than the quality of power data.

Blood Flow Data and Power Data

In the CDI diagnosis, sometimes, important data, such as a mosaic pattern due to backflow of blood, readily distorted by JPEG or MPEG compression. Distortion to blood flow data tends to readily induce false color in an image after decompression (expansion). Here, the false color means a color which is changed as a result of decompression from the color that should be displayed.

This means that quality distortion in an image from CDI presented to a user (such as a doctor) tends to more readily influence images in results of medical diagnosis than quality distortion in an image from PDI presented to the user.

Hence, distortion in blood flow data has a greater influence on the quality of a decompressed image than distortion of power data.

In the embodiment, different parameters are employed, these being a compression parameter for blood flow data (first compression parameter) and a compression parameter for power data (second compression parameter). Accordingly the compression ratio can be raised while still suppressing quality distortion of decompressed images. Compression parameters are parameter controlling the quality of compressed data and the compression ratio and control such factors as the number of data bits and the resolution.

In the embodiment, quality of compressed data may be, for example, a subjective quality level for an image obtained by rendering after decompressing compressed data. In such cases, a subjective image quality (for example MOS: Mean Opinion Score) may be numericalized in subjective evaluation tests for various predetermined values for compression parameters, and associations formed between each compression parameter and high or low quality.

Quality may be expressed by the error in compressed data due to compression between the decompressed compressed data and the data prior to compression. In such cases, a compression parameter for raising quality of compressed data is a parameter for reducing the allowable amount of such error, and a compression parameter with lowers quality of compressed data is a parameter that increases the allowable amount of such error. In other words, the compression parameter is a parameter for controlling the amount of allowable error due to compression.

Configuration of Data Compression Apparatus 1

FIG. 1 illustrates the data compression apparatus 1. The data compression apparatus 1 includes an acquisition unit 11, a separation unit 12, a first compression unit 13, a second compression unit 14, an combining unit 15, and an output unit 16.

The acquisition unit 11 acquires color Doppler data from a probe or from a data memory, not shown. The acquisition unit 11 may acquire the color Doppler data through a network. The separation unit 12 extracts and separates out fluid data (blood flow data) and power data from the color Doppler data.

The first compression unit 13 compresses blood flow data based on the first compression parameter. The second compression unit 14 compresses the power data based on the second compression parameter. The first compression parameter and the second compression parameter are respectively set such that the quality of compressed data for blood flow data when decompressed is higher than the quality of compressed data for power data when decompressed.

The combining unit 15 combines the compressed data for blood flow data and the compressed data for power data to generate a data stream.

The output unit 16 outputs the generated data stream. The destination of the output data stream may be, for example, a display device (not shown) employed by the ultrasonic diagnostic apparatus or a storage device (not shown). For example, the output unit 16 may output the data stream to the display device or the storage device through a network.

The acquisition unit 11, the separation unit 12, the first compression unit 13, the second compression unit 14, the combining unit 15 and the output unit 16 may be implemented by a Central Processing Unit (CPU) and a memory employed by the CPU.

Processing of the Data Compression Apparatus 1

Figure 2:
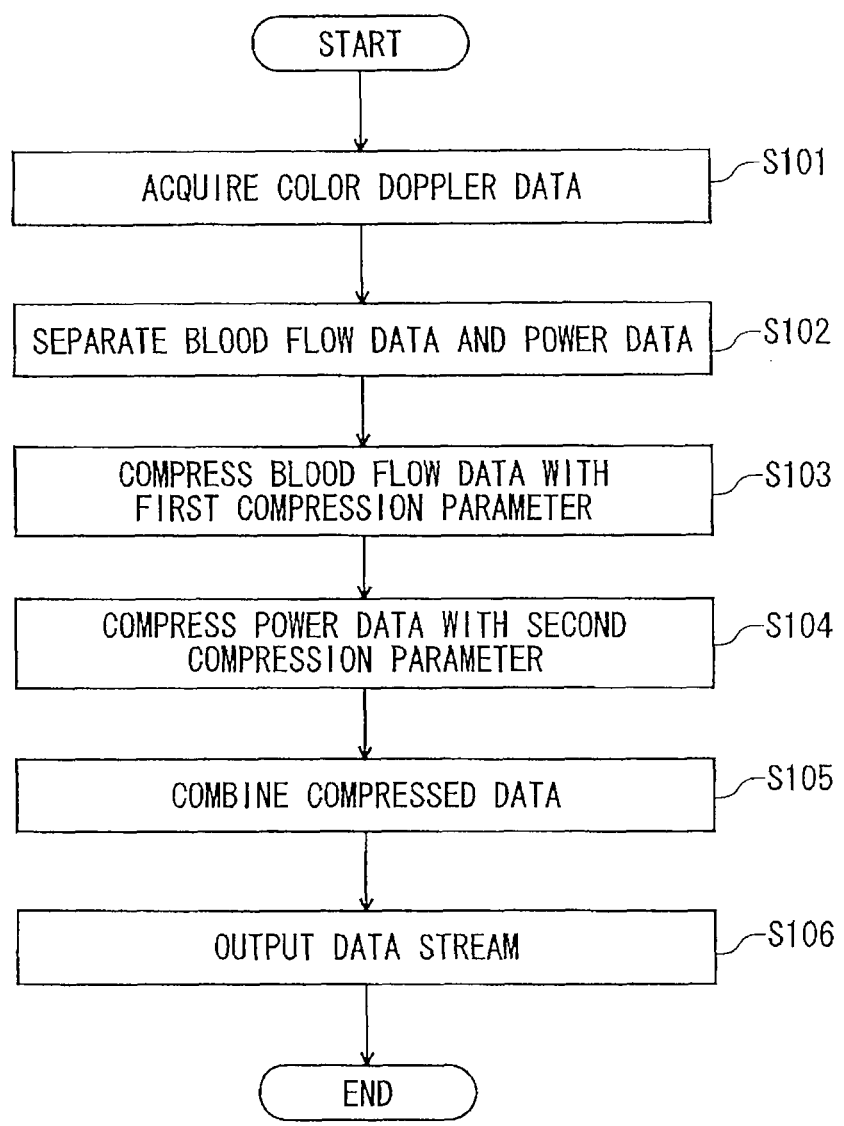
FIG. 2 illustrates processing in the data compression apparatus 1.

FIG. 2 illustrates the processing of the data compression apparatus 1.

The acquisition unit 11 acquires color Doppler data (S101). The separation unit 12 separates the color Doppler data into blood flow data and power data (S102). For example, when three types of data, first blood flow data, second blood flow data, and power data, repeat in series (data similar to that of packet format image data, the sequence is not limited thereto) are inputted as the input color Doppler data, the separation unit 12 respectively extracts, from the input color Doppler data, data for the first blood flow data, data for the second blood flow data, and data for the power data (data similar to data referred to as plain format image data).

The first compression unit 13 compresses the blood flow data based on the first compression parameter (S103). The second compression unit 14 compresses the power data based on the second compression parameter (S104).

Step S103 and step S104 may be reversed, or both steps may be performed at the same time (parallel processing).

The combining unit 15 combines the compressed data for the blood flow data and the compressed data for the power data to generate a data stream (S105). The output unit 16 outputs the generated data stream (S106).

The method of controlling quality of images after decompression depends on the method for performing compression. For example, a quality coefficient (Q value) may be provided for input as the compression method, so as to give a lower compression ratio with smaller error in the color Doppler data acquired the smaller the Q value, and a higher compression ratio with larger error in the color Doppler data acquired the larger the Q value. The first compression parameter and the second compression parameter may be set by such a Q value.

For example, in a compression method utilizing internal quantization, the quantization steps increase the larger the Q value, and the quantization step decrease the smaller Q value. As a control method, for example, MPEG-4 AVC is utilized. Having a large Q value may mean that the error to the acquired color Doppler data is large, without there being a guaranteed increase in the compression ratio.

Compression Parameter

While the compression parameter will be explained as follows, the compression parameters in the embodiment are not limited thereto. The embodiment utilizes at least one of the following examples of compression parameters to perform color Doppler data compression.

In the embodiment, various types of measurement data, such as blood flow data and power data, are referred to as "elements", and the values there are referred to as "element values".

(1) Compression Parameter: Number of Data Bits

As a method for setting a compression parameter, a smaller number of data bits is set for the element value of the power data than the element value for the blood flow data.

For example, the element value of the blood flow data is compressed into 10 bits, and the element value of the power data is compressed into 8 bits. Decoding the compressed data enables the element value to be returned to the original number of data bits (for example by applying bit shifting). In such cases, the first compression parameter determines the number of data bits of the blood flow data, and the second compression parameter determines the number of data bits of the power data.

Namely, the first compression parameter and the second compression parameter are set so as to satisfy the relationship stated above.

(2) Compression Parameter: Resolution

As a method for setting a compression parameter, for example, the resolution of element values for the power data is made lower than that of the element values of the blood flow data.

For example, the blood flow data may be held with the original element values, and the element values for the power data held with down-sampled element values (for example, taking average values over a number of data elements). Decoding of the compressed data may be executed by up-sampling the down-sampled data (for example, by generating interpolated element values for those lost during down-sampling). In such cases, the first compression parameter determines the resolution of the blood flow data, and the second compression parameter determines the resolution of the power data. The parameter determining the resolution may, for example, be configured as a sampling factor value (a value of the input sampling number divided by the output sampling number) for each axis of two dimensional data (blood flow data and power data).

Namely, the first compression parameter and the second compression parameter are set so as to satisfy the relationship stated above.

(3) Compression Parameter: Lossless-Lossy Switching

As a method for setting a compression parameter, for example, lossless compression is applied to the element values of the blood flow data, and lossy compression is applied to the element values of the power data. For example, the lossless compression is applied to the blood flow data and the lossy compression is applied to the power data. In such cases, the compression parameters arc, for example, implemented by means of a lossless compression flag set at 1 for lossless compression and 0 for lossy compression. In this example, the first compression parameter is the lossless compression flag of 1 such that the lossless compression is applied to the blood flow data, and the second compression parameter is the lossless compression flag of 0 such that the lossy compression is applied to the power data.

(4) Compression Parameter: Quantization Step for Differential Compression

As a method for setting a compression parameter, for example, differential compression of element values is utilized. In such cases, the compression ratio can be raised by setting the quantization step smaller for the element values of the blood flow data and the quantization step larger for the element values of the power data. The compression parameter in such cases is the quantization step. The first compression parameter and the second compression parameter are set to satisfy the magnitude relationship of the quantization steps.

Figure 3:
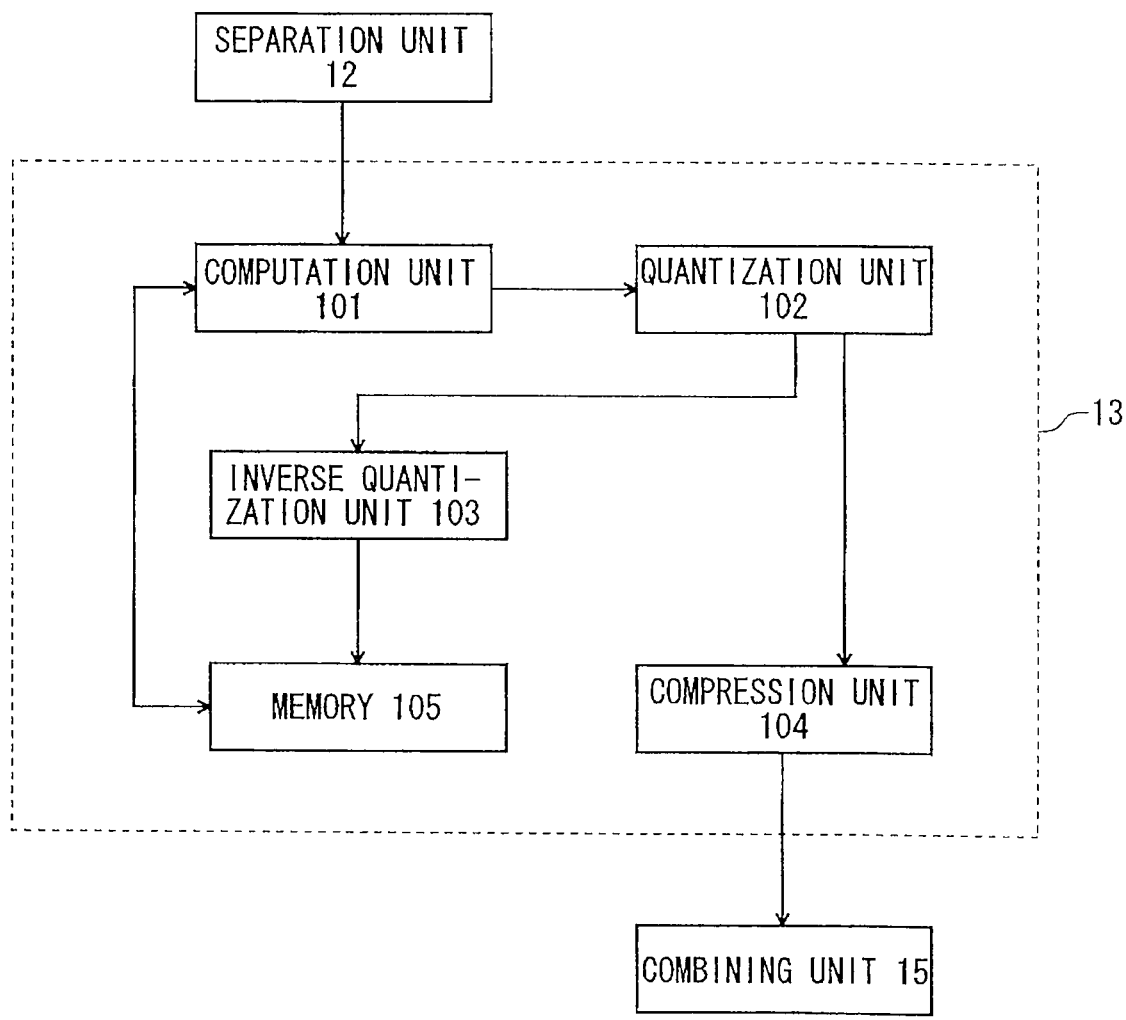
FIG. 3 illustrates a part of the data compression apparatus 1.

FIG. 3 illustrates the first compression unit 13 when differential compression is employed. Similar applies to the second compression unit 14. In differential compression, element value that has already been compressed is held in a memory, and the entropy encoding is applied to the difference between the input element values and the element values held in the memory.

Reference to element values here refers to the element values of the blood flow data for the first compression unit 13, however for the second compression unit 14 the element values are for the power data.

In the present example, the first compression unit 13 (or the second compression unit 14) may include a computation unit 101, a quantization unit 102, an inverse quantization unit 103, a compression unit 104, and a memory 105.

Figure 4:
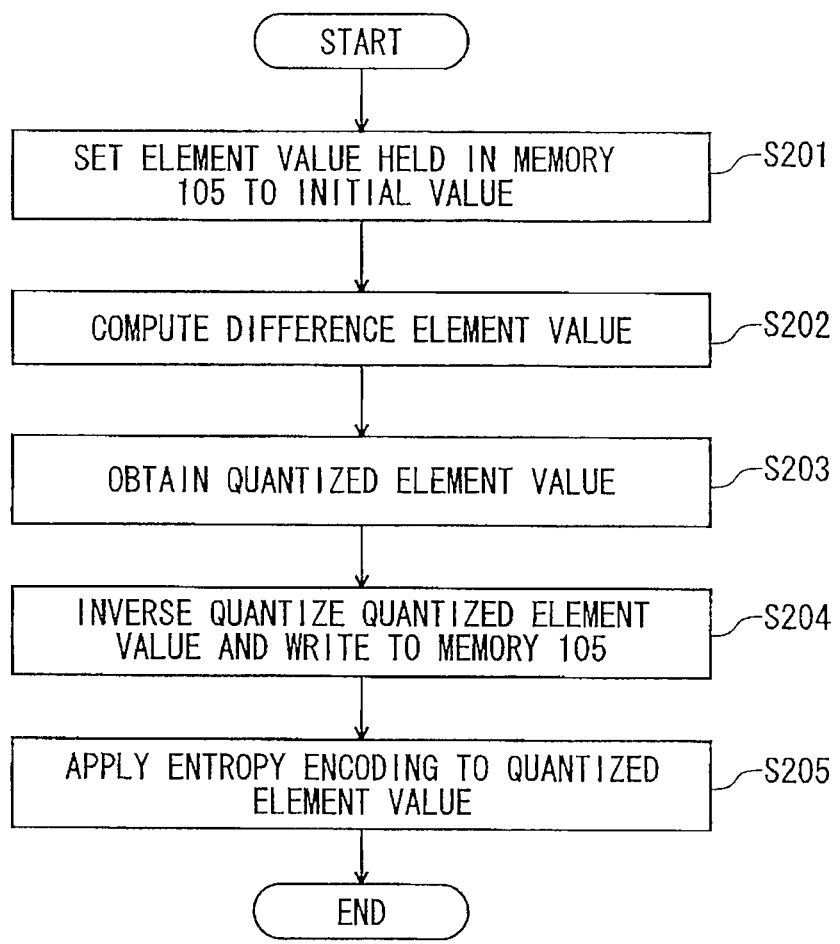
FIG. 4 illustrates an example of processing of a first compression unit 13.

FIG. 4 illustrates processing in the first compression unit 13 in the present example. Similar applies to processing in the second compression unit 14.

The memory 105 is set with a predetermined initial value (for example 0) for the element value to be held (forecast element value) (S201).

The computation unit 101 then acquires an element value from the separation unit 12, reads the forecast element value held in the memory 105 and subtracts the forecast element value from the acquired element value, thereby computing a difference element value (S202). The computation unit 101 supplies the difference element value to the quantization unit 102.

The quantization unit 102 quantizes the difference element value to obtain a quantized element value (S203). The quantization unit 102 then supplies the quantized element value to the inverse quantization unit 103 and the compression unit 104.

The inverse quantization unit 103 performs inverse quantization on the supplied quantized element value, and writes the result to the memory 105 as the next forecast element value (S204). This forecast element value is employed by the computation unit 101 for computing the next difference element value.

The compression unit 104 performs the entropy encoding on the supplied quantized element value (S205). The compression unit 104 supplies the compressed data to the combining unit 15 after the entropy encoding.

Step S204 and step S205 may be reversed, or processing may be performed at the same time (parallel processing).

In the present example, there is no absolute requirement to perform the entropy encoding. In the present example, the entropy encoding means a method of variable length compression of fixed length data and, for example, exponential Golomb coding, Huffman coding, arithmetic coding or a range encoding may be employed.

In the present example, the element value compressed immediately before is employed as the forecast value for the next element value. However, for example, the element value may be forecast by a different forecasting method, such as a forecasting method employed in lossless JPEG or a LOCO-I forecasting algorithm employed in JPEG-LS.

(5) Compression Parameter: Quantization Factor for Block Transform

As a method of setting a compression parameter, for example, Doppler data is sectioned into blocks, transformation and quantization is performed at the block unit level, and the obtained quantization coefficient is held.

Similarly to in differential compression, a higher compression ratio can be achieved by making the quantization step for blood flow data element values narrower and the quantization step for power data element values wider. As a compression parameter, for example, a quantization table corresponding to transform block sizes can be employed. Or, for example, two items of a quantization table corresponding to conversion block sizes and respective multiplier Q value may be used as the compression parameter. Making the quantization step of the power data element values larger than the quantization step of the blood flow data element values means, for example, making the average of the numerical values in the second quantization table corresponding to the power data larger than the average numerical values in the first quantization table corresponding the blood flow data. The first compression parameter and the second compression parameter are set such that such a magnitude relationship between the quantization steps is achieved.

Figure 5:
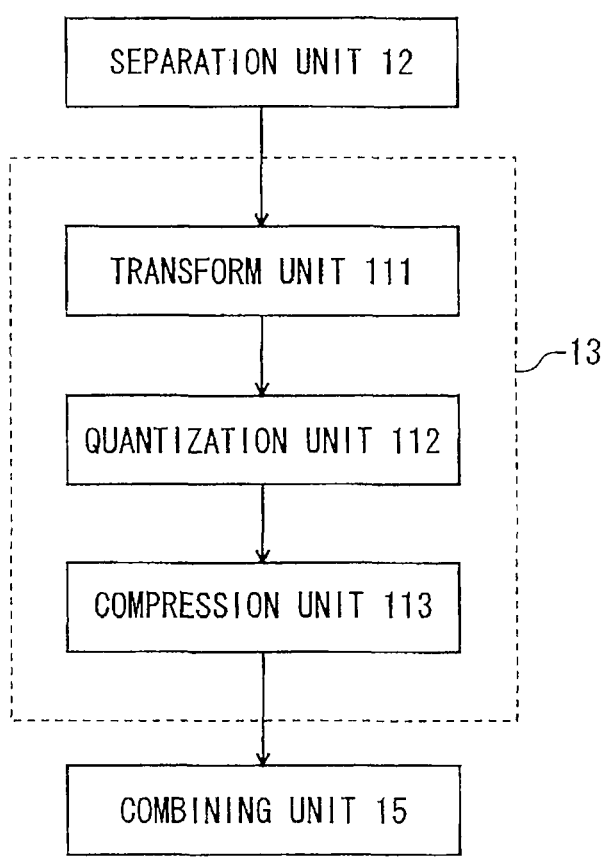
FIG. 5 illustrates a part of the data compression apparatus 1.

FIG. 5 illustrates the first compression unit 13 when compression utilizing block transform is employed. Similar applies to the second compression unit 14. In the present example, the first compression unit 13 (or the second compression unit 14) may be configured with a transform unit 111, a quantization unit 112, and a compression unit 113.

Figure 6:
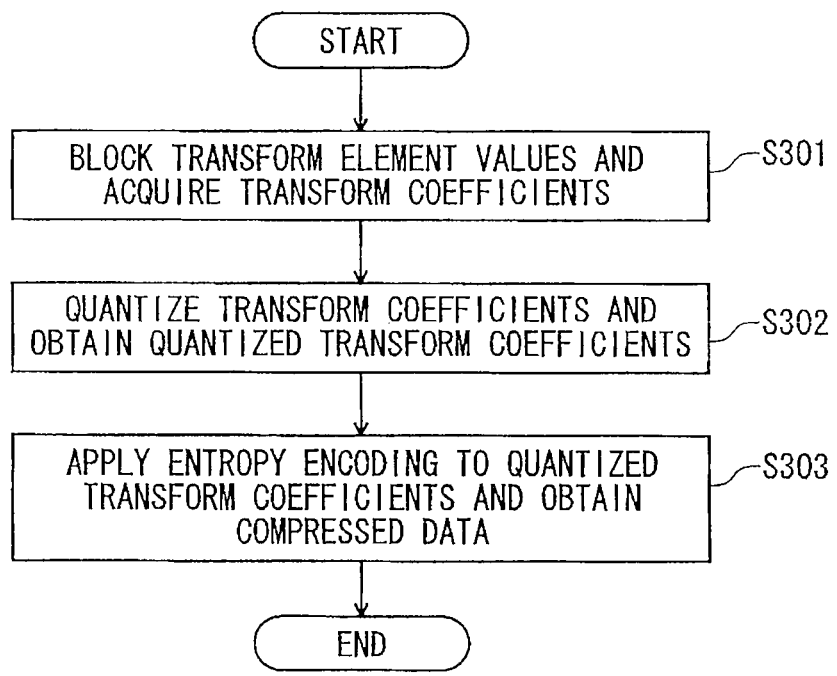
FIG. 6 illustrates an example of processing of the first compression unit 13.

FIG. 6 illustrates processing of the first compression unit 13 in the present example. Similar applies to the second compression unit 14.

The transform unit 111 acquires Doppler data from the separation unit 12, applies block transform to blocks of element values, and obtains transform coefficients (S301). A specific example of block transform is described later.

The quantization unit 112 quantizes the transform coefficients according to a pre-stored quantization table to obtain quantized transform coefficients (S302). FIG. 7 illustrates a quantization table in the present example. For example, as the quantization table, there may be employed a table of table values exemplified in FIG. 7 multiplied by quality values as a compression parameter, for a two dimensional block with 8 points in each of the vertical and horizontal directions, and then rounded into integers.

The compression unit 113 performs the entropy encoding on the quantized transform coefficients to obtain compressed data (S303). The compression unit 113 supplies the compressed data after the entropy encoding to the combining unit 15.

A discrete cosign transform (DCT) will be explained as an example of block transform. A DCT is defined in one dimension, however, for example, two dimensional DCT can be executed by sequentially application of a vertical or horizontal one dimensional DCT, or an inverse discrete cosign transform (IDCT). Similar applies to three or more dimensional DCTs, and the DCT or the IDCT may be applied in sequence to each axis.

If the number of input points in a one dimensional DCT and its inverse transform IDCT is N then the following Equation (1) is applied.

$$F(X) = \frac{1}{\sqrt{N}} c(X) \sum_{x=0}^{N-1} f(x) \cos\left\{\frac{(2x+1)X}{2N}\pi\right\}$$
$$X = 0, 1, \ldots, N-1$$

$$f(X) = \frac{1}{\sqrt{N}} \sum_{x=0}^{N-1} c(X) F(X) \cos\left\{\frac{(2x+1)X}{2N}\pi\right\}$$
$$x = 0, 1, \ldots, N-1$$

Equation (1)

In Equation (1) f(x) is the input values and F(X) represents the DCT coefficients. C(X) is a constant represented by Equation (2).

$$c(X) = \begin{cases} 1/\sqrt{2} & X = 0 \\ 1 & X \neq 0 \end{cases}$$

Equation (2)

Block transform is not limited to DCT and, for example, Hadamard transform and discrete sign transform (DST), or a transform employing an orthogonal base based on training data or principal component analysis of subject data may be employed.

(6) Compression Parameter: Quantization Factor for Wavelet Transform

As a setting method for compression parameters, for example, a wavelet transform is applied to Doppler data, and the obtained coefficients are quantized and stored. Similar to in previous examples, the compression ratio can be raised by making the quantization step for the blood flow data element values narrower and the quantization step of the element values for the power data wider. The compression parameters may, for example, employ a quantization table corresponded to each of the components of wavelet transform. Alternatively configuration may be made with the two items of the quantization table and the respective Q values as compression parameters. Setting the quantization step of the element values for power data wider than the quantization step of the element values for the blood flow data means, for example, making the average numerical value of a second quantization table corresponding to the power data larger than the average numerical value of a first quantization table corresponding to the blood flow data. The first compression parameter and the second compression parameter are set so as to achieve such a magnitude relationship for the quantization steps.

Figure 8:
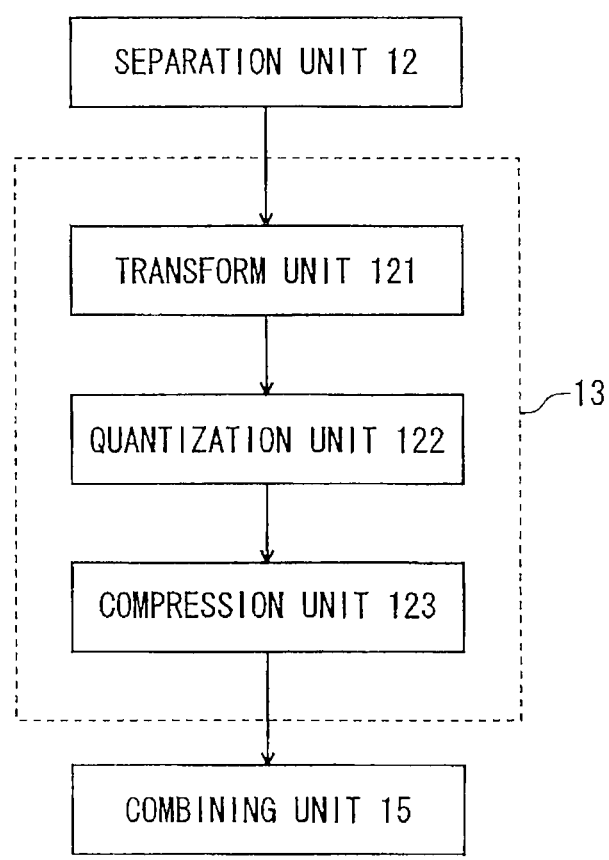
FIG. 8 illustrates a part of the data compression apparatus 1.

FIG. 8 illustrates the first compression unit 13 when performing compression utilizing a wavelet transform. Similar applies to the second compression unit 14. In the present example, the first compression unit 13 (or the second compression unit 14) may be configured with a transform unit 121, a quantization unit 122 and a compression unit 123.

Figure 9:
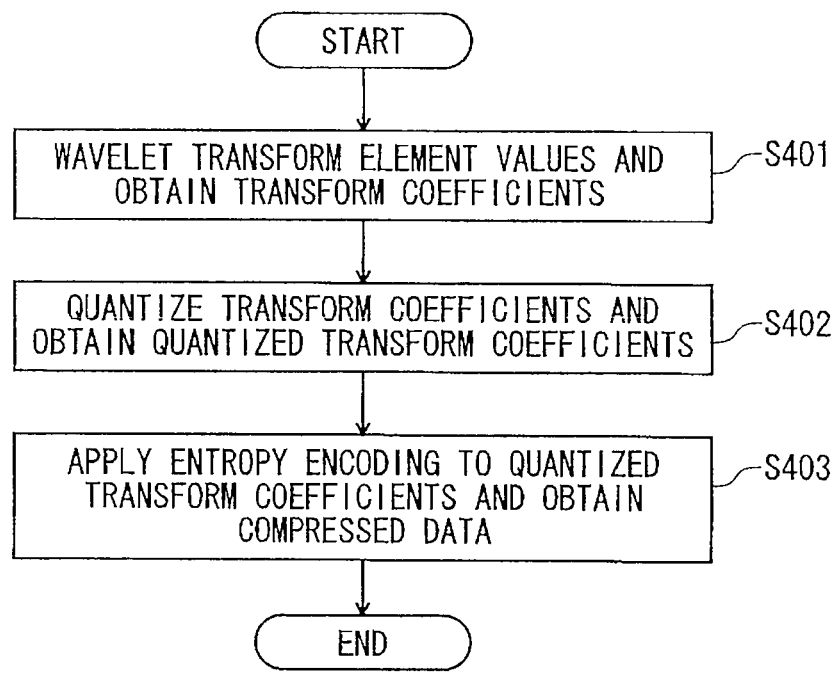
FIG. 9 illustrates an example of processing of the first compression unit 13.

FIG. 9 illustrates processing of the first compression unit 13 in the present example. Similar applies to the second compression unit 14.

The transform unit 121 acquires Doppler data from the separation unit 12 and applies a wavelet transform to the element values to obtain transform coefficients (S401). A specific example of wavelet transform is described later.

The quantization unit 122 quantizes the transform coefficients according to a pre-stored quantization table to obtain quantized transform coefficients (S402). FIGS. 10A and 10B illustrate quantization tables in the present example. For example, as the quantization table, there may be employed a table of table values exemplified in FIG. 10B by quality values, for a two dimensional table of 3 level transform coefficients (coefficient array as exemplified in FIG. 10A), and rounded into integers.

The compression unit 123 performs the entropy encoding on the quantized transform coefficients to obtain compressed data (S403). The compression unit 123 supplies the compressed data after the entropy encoding to the combining unit 15.

In the present example, there are no particular limitations to the type of wavelet transform, and, for example, a Haar wavelet transform, a 5/3 wavelet transform or a 9/7 wavelet transform may be employed.

Figure 11:
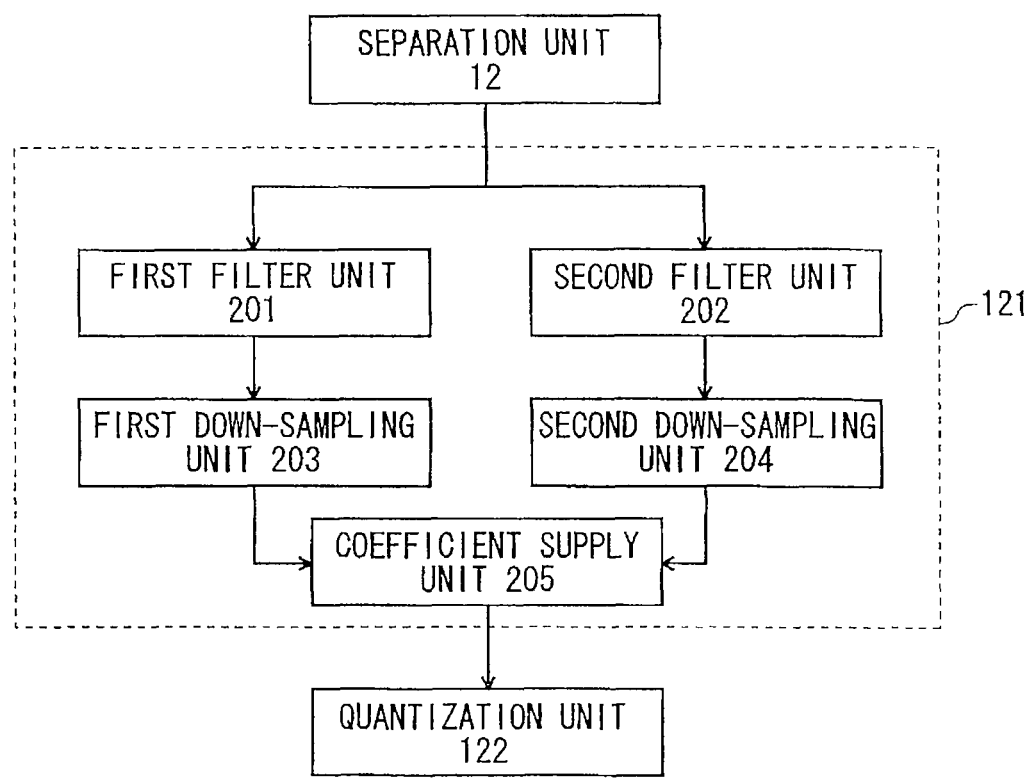
FIG. 11 illustrates a transform unit 121.

Wavelet transform will be explained. FIG. 11 illustrates the transform unit 121 in the present example. The transform unit 121 may be configured with a first filter unit 201, a second filter unit 202, a first down-sampling unit 203, a second down-sampling unit 204, and a coefficient supply unit 205.

The first filter unit 201 applies a low pass filter (LPF) to the Doppler data acquired from the separation unit 12. The first filter unit 201 supplies the LPF-applied-Doppler data to the first down-sampling unit 203.

The second filter unit 202 applies a high pass filter (HPF) to the Doppler data. The second filter unit 202 supplies the HPF-applied-Doppler data to the second down-sampling unit 204.

The first down-sampling unit 203 and the second down-sampling unit 204 apply down-sampling respectively to their received (filter processed) Doppler data (for example, "2:1 down-sampling" in which one sample is thinned from every two samples). The first down-sampling unit 203 and the second down-sampling unit 204 are preferably configured such that the positions of the LPF thinned sample and the HPF thinned sample are different from each other during down-sampling. The first down-sampling unit 203 and the second down-sampling unit 204 supply their respective down-sampled data to the coefficient supply unit 205.

The coefficient supply unit 205 supplies the received down-sampled data as transform coefficients to the quantization unit 122.

Figure 12:
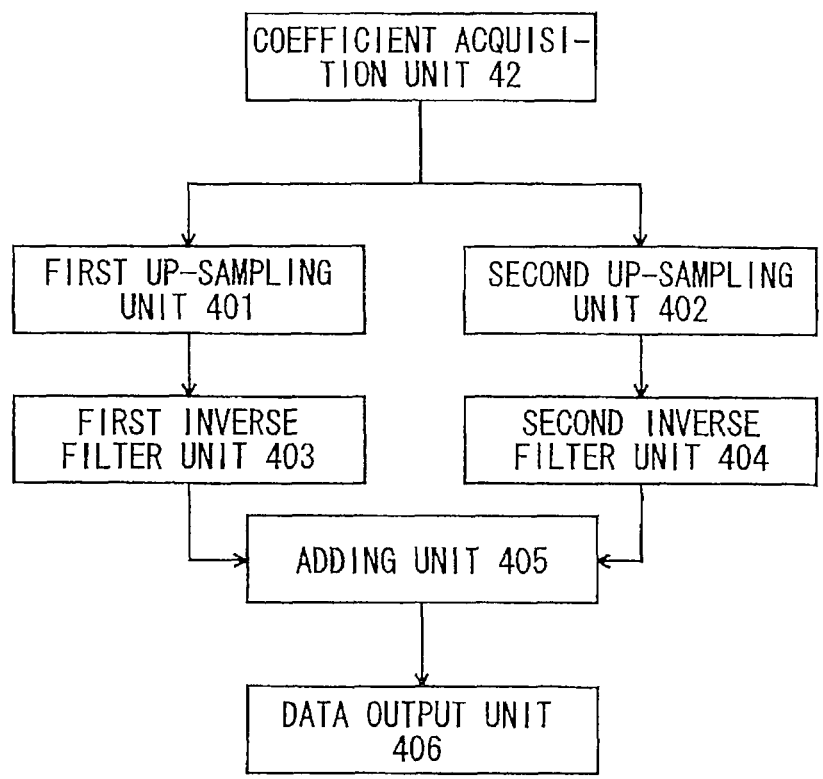
FIG. 12 illustrates an inverse wavelet conversion unit in a decoding device on the decompression side.

Inverse wavelet transform at the decompression side will be described. FIG. 12 illustrates an inverse wavelet transform unit in a decoding device on the decompression side. An inverse wavelet transform unit may be configured with a coefficient acquisition unit 42, a first up-sampling unit 401, a second up-sampling unit 402, a first inverse filter unit 403, a second inverse filter unit 404, an adding unit 405 and a data output unit 406.

The coefficient acquisition unit 42 acquires transform coefficients and separates these into LPF coefficients and HPF coefficients. The coefficient acquisition unit 42 then supplies the LPF coefficients to the first up-sampling unit 401. The coefficient acquisition unit 42 also supplies the HPF coefficients to the second up-sampling unit 402.

The first up-sampling unit 401 applies up-sampling to the LPF coefficients (for example performs 1:2 up-sampling by inserting 0 for discarded samples) to obtain a sample array. The second up-sampling unit 402 applies up-sampling to the HPF coefficients to obtain a sample array.

The adding unit 405 adds together the respective sample arrays obtained by the first up-sampling unit 401 and the second up-sampling unit 402. The data output unit 406 then outputs as decoded data the data obtained by adding.

FIG. 13 illustrates LPF coefficients and HPF coefficients employed in a 5/3 wavelet transform and an inverse 5/3 wavelet transform. The filter coefficients $C[k]$ ($k=-2, -1, 0, 1, 2$) are coefficients corresponding to phase positions $-2$ to $+2$, and the LPF and HPF derive and output sum values from the acquired element value arrays.

The wavelet transform and inverse wavelet transform referred to above are, similarly to the DCT and IDCT, defined in one dimension. However, for example, similarly to with the DCT and the IDCT, a two dimension transform can be executed by applying a vertical or horizontal one dimensional transform in sequence. Similarly sequential application of transform to each of the axis may be employed for three or more dimensional transform.

This completes the explanation of examples of compression parameters.

Figure 14:
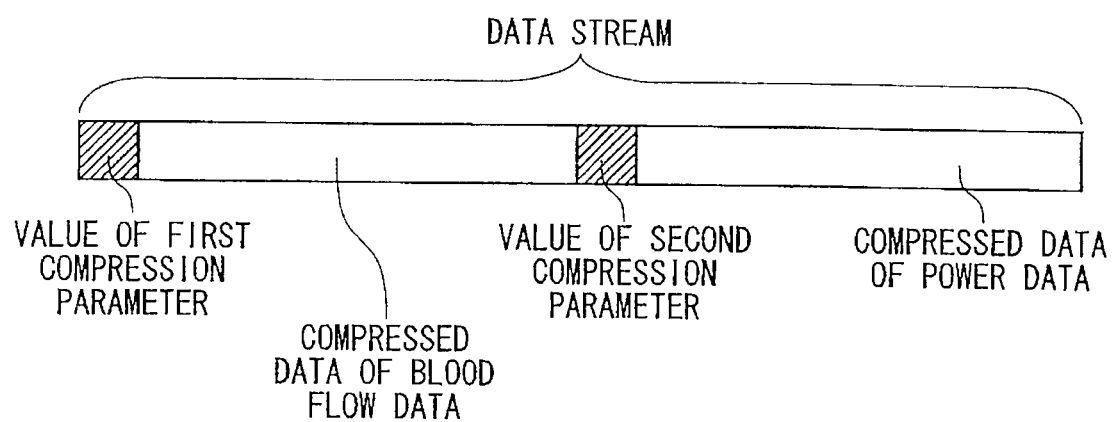
FIG. 14 illustrates a data stream.

FIG. 14 illustrates a data stream in the embodiment. The combining unit 15, for example, may be configured to append the value of the first compression parameter at the header portion of compressed data for blood flow data, and append the value of the second compression parameter at the header portion of the compressed data for the power data to generate a compressed data stream.

In the embodiment, the separation unit 12 may be dispensed with if the acquisition unit 11 acquires plural elements (blood flow data and power data) in an initially separated state. In such cases, the acquisition unit 11 supplies the blood flow data to the first compression unit 13 and supplies the power data to the second compression unit 14.

When the blood flow data is represented in two dimensions then, as shown in FIG. 2, the same compression parameter may be employed for compressing the two sets of blood flow data, or, for example as in a method illustrated in a second embodiment, compression may be performed with separated respective compression parameters.

Modified Example

In the embodiment, the compression parameters are fixed. In such cases, for example, a quality setting function can be incorporated into a device housing the compression function, and a Q value representing the quality of compressed data when decompressed set prior to operation of the device (or set at the time of factory shipping). Then the respective compression parameters may be set with reference to the Q value when initializing the device for operation.

Figure 15:
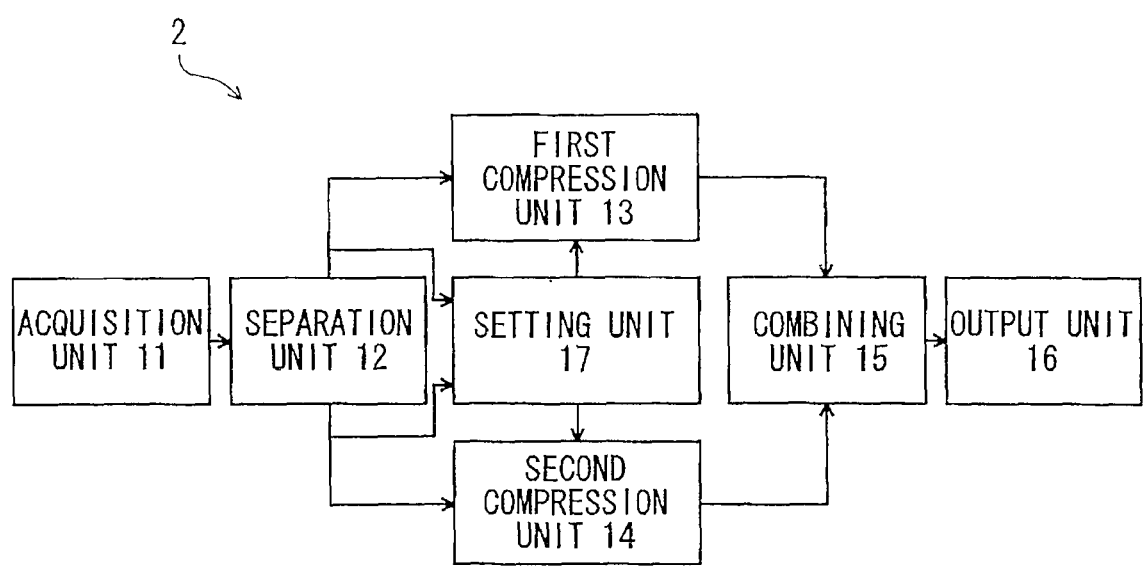
FIG. 15 illustrates processing of a data compression apparatus 2 according to a modified example of a first embodiment.

As a modified example, an example in which the compression parameters are dynamically controllable will be described. FIG. 15 illustrates a data compression apparatus 2 according to the modified example. The data compression apparatus 2 is configured with an additional setting unit 17 for the data compression apparatus 1.

The setting unit 17 references the data characteristics of the blood flow data and the data characteristics of the power data and derives a first compression parameter and a second compression parameter such that the quality of the blood flow data is higher than the quality of the power data when the respective compressed data is decompressed. The setting unit 17 is accordingly, capable of dynamically setting each of the compression parameters. The data characteristics are characteristics expressing the relationships between each value in the data.

A case in which quantization is performed in block transform as a setting method for compression parameters (example (5) above)) will be explained.

The setting unit 17 computes activity values for each element of the color Doppler data expressing the degree of complexity within a block, and raises or lower the Q value according to the activity value. In such cases, the activity value is the data characteristic.

When doing so, a reference quantization step or reference quantization table is determined in advance for each element so as to conform to the predetermined importance of each element of the Doppler data. The setting unit 17 computes the multiple of the reference quantization step or the reference quantization table and the Q value as the reference quantization step or the reference quantization table. The setting unit 17 employs integer rounded values thereof to control the first compression parameter and the second compression parameter such that the quality of the blood flow data is higher than the quality of the power data.

With respect to activity values of compression parameters, for example, the average of computed absolute value differences for each element value in a block between the element value and the average element value in a block may be employed as the activity value.

The setting unit 17 may set each of the compression parameters based on input from a user. With respect to each element, for example, a reference quantization table may be determined such that a magnitude relationship between quantization steps between elements is satisfied, and a quantization table generated by multiplying the respective reference quantization table by a Q value externally applied by a user.

By setting compression parameters that reflect the quality of the Doppler data, the compression ratio can be raised both with a fixed compression parameter and a controlled compression parameter.

When the compression parameter is fixed, the compression ratio can be raised without the need for computation or a circuit to perform compression parameter control. The compression ratio can be raised further by appropriate control when controlling the compression parameter than when the compression parameter is fixed, while the computation load or circuit scale requirement is increased.

The embodiment and modified example thereof enables the compressed data of small data volume to be generated while suppressing quality distortion of images post decompression by compressing color Doppler data such that the quality of blood flow data is higher than the quality of power data after compressed data has been decompressed.

Second Embodiment

In the first embodiment, the data compression apparatus 1 has two elements for subjecting to compression, these being the blood flow data and power data of Doppler data.

In the second embodiment the data compression apparatus 1 also has two elements for subjecting to compression, with these being blood flow velocity and blood flow dispersion included in the blood flow data. In the embodiment, power data may or may not be included in the data subjected to compression.

Blood Flow Velocity and Blood Flow Dispersion

For example, two elements of the blood flow velocity and the blood flow dispersion are employed as a method of expressing the blood flow data. For example, when rendering an image, the density or paleness of red and the density or paleness of blue may be employed as representations of the corresponding blood flow velocity and blood flow direction.

The blood flow dispersion may be represented by changing the color representing the blood flow velocity to a yellow or green color according to the magnitude of the blood flow dispersion. Distortion of the blood flow velocity is known to have a greater effect on the quality of decompressed images than distortion in the blood flow dispersion.

Hence, in a data compression apparatus of the embodiment, color Doppler data is compressed such that the quality of the blood flow velocity is higher than the quality of the blood flow dispersion when the compressed data is decompressed.

Configuration of a data compression apparatus of the embodiment is similar to that of the data compression apparatus 1 illustrated in FIG. 1.

Data Compression Apparatus Processing

Figure 16:
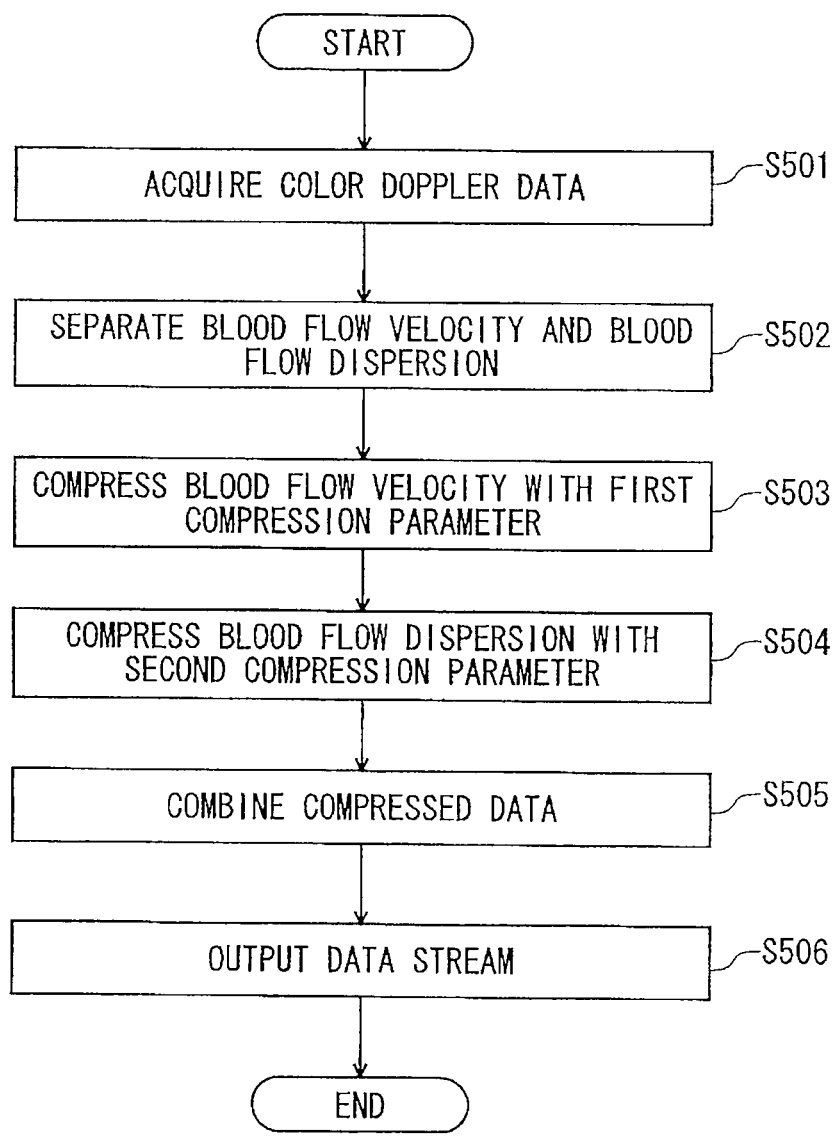
FIG. 16 illustrates processing of a data compression apparatus according to a second embodiment.

FIG. 16 illustrates processing of the data compression apparatus according to the embodiment.

The acquisition unit 11 acquires color Doppler data (S501). The color Doppler data in the embodiment may include at least blood flow velocity and blood flow dispersion.

The separation unit 12 extracts and separates blood flow velocity (data) and blood flow dispersion (data) from the color Doppler data (S502).

The first compression unit 13 compresses the blood flow velocity according to a first compression parameter (S503). The second compression unit 14 compresses the blood flow dispersion according to a second compression parameter (S504).

Step S503 and step S504 may be reversed, or both steps may be performed at the same time (parallel processing). The first compression parameter and the second compression parameter here are each set such that the quality of the compressed data for blood flow velocity when decompressed is higher than the quality of compressed data for blood flow dispersion when decompressed.

The combining unit 15 combines the compressed data for the blood flow data and the compressed data for the blood flow dispersion to generate a data stream (S505).

The output unit 16 outputs the generated data stream (S506).

Compression Parameters

The compression parameters may be set in the embodiment similarly to in the first embodiment. For example, when a number of data bits is employed as the compression parameter, the element value of the blood flow velocity is represented in 8 bits and the element value of the blood flow dispersion is represented in 6 bits.

When switching between lossless and lossy is employed as the compression parameter, for example, the lossless compression may be applied to the blood flow velocity, and the lossy compression may be applied to the blood flow dispersion.

Examples of other compression parameters are also similar to those in the first embodiment, and the first embodiment may be read with blood flow velocity replacing blood flow data and blood flow dispersion replacing power data.

In the embodiment, compressed data with a small data volume can be generated while suppressing quality distortion of images after decompression by compressing color Doppler data such that the quality of the blood flow velocity is higher than the quality of the blood flow dispersion when the compressed data has been decompressed.

Modified Example

The embodiment, the blood flow data may include two elements of the magnitude of blood flow and angle of blood flow. The magnitude M of the blood flow and the angle A of the blood flow are values expressed by the following Equation (3) and Equation (4) wherein the blood flow velocity is V and the blood flow dispersion is T.

$$M = \sqrt{V^2 + T^2} \quad \text{Equation (3)}$$

$$A = \tan^{-1}\frac{T}{V} \quad \text{Equation (4)}$$

The present modified example, similarly to those described above, can generate compressed data of small volume while suppressing quality distortion of images after decompression by compressing color Doppler data such that the quality of blood flow magnitude is higher than the quality of blood flow angle when compressed data has been decompressed.

The blood flow data referred to in the above embodiment is, for example, data including at least one of blood flow velocity, blood flow dispersion, blood flow magnitude, and/or blood flow angle, however there is no limitation thereto and data of the spatial movement of blood flow may be represented in a different format.

Instruction for the processing sequence illustrated in the above embodiments may be executed by a software program. A general purpose computation system pre-stored with such a program can achieve a similar effect to the signal processing apparatus (data compression apparatus) of the above embodiments by reading such a program. The instruction described in the above embodiments is stored as a computer executable program on a magnetic disk (such as a flexible disk or hard disk), an optical disk (such as a CD-ROM, CD-R, CD-RW, DVD-ROM, DVD±R or DVD±RW), semiconductor memory or similar storage medium. Any storage format may be employed for a storage medium as long as it is readable by a computer or embedded system. Similar action can be achieved to that of the signal processing apparatus in the above embodiments by employing a computer to read in such a program from a storage medium and by using a CPU to execute the program according to the instructions written in the program. Obviously the computer may employ a network through which to acquire or read the program when acquiring or reading in the program.

A portion of the processing for implementing the embodiments may be executed by an Operating System (OS) activated on a computer based on instructions of a program installed from a storage medium onto the computer or an embedded system, or by middle ware such as database management software or a network.

A storage medium of in the embodiment is not limited to a medium independent of a computer or embedded system, and includes a storage medium that downloads and stores or temporarily stores a program such as by transmission over a LAN or the Internet.

There is also no limitation to a single storage medium. The storage medium may have any configuration, and the processing of the embodiments may be executed from plural storage media.

A computer or embedded system of embodiments described herein executes each processing of embodiments described herein based on a program stored on a storage medium, and may be a single apparatus such as a personal computer or microcomputer, or may be a system of plural apparatuses connected together through a network.

A computer of embodiments described herein is not limited to a personal computer and includes such devices as a computation processing apparatus including a data processing device, a microcomputer or any other device or apparatus capable of executing the functionality of embodiments described herein through a program.

Various embodiments have been exemplified above, however these embodiments are merely illustrative examples and are not intended as scope limitations. These novel embodiments may be implemented by various other embodiments, and various omissions, substitutions and modifications may be performed within a scope of the invention. Such embodiments and modifications thereof will fall within the scope of the invention and within the scope of Claims and their equivalents.

The invention claimed is:

1. A data compression apparatus for compressing Doppler data including first measurement data and second measurement data obtained by ultrasound measurement, comprising:
   a first compression unit configured to compress the first measurement data according to a first compression parameter to thereby generate first compressed data;
   a second compression unit configured to compress the second measurement data according to a second compression parameter different from the first compression parameter to thereby generate second compressed data; and
   a combining unit configured to combine, via a processor, the first compressed data and the second compressed data,
   wherein the first compression parameter and the second compression parameter are set such that a quality of the first compressed data when decompressed is higher than a quality of the second compressed data when decompressed.

2. The apparatus of claim 1, further comprising:
   a setting unit configured to set the first compression parameter and the second compression parameter according to a characteristic of the first measurement data and a characteristic of the second measurement data.

3. The apparatus of claim 1,
   wherein the first measurement data represents a spatial movement of a fluid, such as blood, and
   wherein the second measurement data represents an intensity of reflected ultrasonic waves.

4. The apparatus of claim 1,
   wherein the first measurement data represents a velocity of a fluid, such as blood, and
   wherein the second measurement data represents a dispersion of the fluid.

5. The apparatus of claim 3,
   wherein the first compression unit performs a transform including a block transform or a wavelet transform on the first measurement data and quantizes a coefficient obtained by the transform,
   wherein the second compression unit performs a transform including a block transform or a wavelet transform on the second measurement data and quantizes a coefficient obtained by the transform,
   wherein the first compression parameter and the second compression parameter are set such that each component of a first quantization table for the first measurement data does not exceed each corresponding component of a second quantization table for the second measurement data, and
   wherein at least one component of the first quantization table is smaller than the corresponding component of the second quantization table.

6. The apparatus of claim 3,
   wherein the first compression parameter determines a resolution of the first compressed data,
   wherein the second compression parameter determines a resolution of the second compressed data, and
   wherein the second compression unit down-samples the second measurement data according to the second compression parameter.

7. The apparatus of claim 3,
   wherein the first compression unit computes a first difference value between adjacent data for the first measurement data and quantizes the first difference value,
   wherein the second compression unit computes a second difference value between adjacent data for the second measurement data and quantizes the second difference value, and
   wherein the first compression parameter and the second compression parameter are set such that an average value of a quantized step number for the first measurement data is smaller than an average value of a quantized step number for the second measurement data.

8. The apparatus of claim 3,
   wherein the first compression parameter expresses that a lossless compression is to be applied to the first measurement data,
   wherein the second compression parameter expresses that a lossy compression is to be applied to the second measurement data,
   wherein the first compression unit applies a lossless compression to the first measurement data according to the first compression parameter to generate the first compressed data, and
   wherein the second compression unit applies a lossy compression to the second measurement data according to the second compression parameter to generate the second compressed data.

9. The apparatus of claim 3,
   wherein the first compression parameter determines a first number of data bits of the first compressed data,
   wherein the second compression parameter determines a second number of data bits of the second compressed data,
   wherein the first compression unit compresses the first measurement data to the first number of data bits, and
   wherein the second compression unit compresses the second measurement data to the second number of data bits smaller than the first number of data bits.

10. The apparatus of claim 4,
wherein the first compression unit performs a transform including a block transform or a wavelet transform on the first measurement data and quantizes a coefficient obtained by the transform,
wherein the second compression unit performs a transform including a block transform or a wavelet transform on the second measurement data and quantizes a coefficient obtained by the transform,
wherein the first compression parameter and the second compression parameter are set such that each component of a first quantization table for the first measurement data does not exceed each corresponding component of a second quantization table for the second measurement data, and
wherein at least one component of the first quantization table is smaller than the corresponding component of the second quantization table.

11. The apparatus of claim 4,
wherein the first compression parameter determines a resolution of the first compressed data,
wherein the second compression parameter determines a resolution of the second compressed data, and
wherein the second compression unit down-samples the second measurement data according to the second compression parameter.

12. The apparatus of claim 4,
wherein the first compression unit computes a first difference value between adjacent data for the first measurement data and quantizes the first difference value,
wherein the second compression unit computes a second difference value between adjacent data for the second measurement data and quantizes the second difference value, and
wherein the first compression parameter and the second compression parameter are set such that an average value of a quantized step number for the first measurement data is smaller than an average value of a quantized step number for the second measurement data.

13. The apparatus of claim 4,
wherein the first compression parameter expresses that a lossless compression is to be applied to the first measurement data,
wherein the second compression parameter expresses that a lossy compression is to be applied to the second measurement data,
wherein the first compression unit applies the lossless compression to the first measurement data according to the first compression parameter to generate the first compressed data, and
wherein the second compression unit applies the lossy compression to the second measurement data according to the second compression parameter to generate the second compressed data.

14. The apparatus of claim 4,
wherein the first compression parameter determines a first number of data bits of the first compressed data,
wherein the second compression parameter determines a second number of data bits of the second compressed data,
wherein the first compression unit compresses the first measurement data to the first number of data bits, and
wherein the second compression unit compresses the second measurement data to the second number of data bits smaller than the first number of data bits.

15. A data compression method for compressing Doppler data including first measurement data and second measurement data obtained by ultrasound measurement, comprising:
compressing the first measurement data according to a first compression parameter to thereby generate first compressed data;
compressing the second measurement data according to a second compression parameter different from the first compression parameter to thereby generate second compressed data; and
combining, via a processor, the first compressed data with the second compressed data to generate a data stream,
wherein the first compression parameter and the second compression parameter are set such that a quality of the first compressed data when decompressed is higher than a quality of the second compressed data when decompressed.

16. A computer-readable medium storing computer-readable instructions thereon which when executed by a computer cause the computer to perform a data compression method for compressing Doppler data including first measurement data and second measurement data obtained by ultrasound measurement, the method comprising:
compressing the first measurement data according to a first compression parameter to thereby generate first compressed data;
compressing the second measurement data according to a second compression parameter different from the first compression parameter to thereby generate second compressed data; and
combining the first compressed data with the second compressed data to generate a data stream,
wherein the first compression parameter and the second compression parameter are set such that a quality of the first compressed data when decompressed is higher than a quality of the second compressed data when decompressed.

* * * * *